United States Patent
Abdoli et al.

(10) Patent No.: US 9,742,608 B2
(45) Date of Patent: Aug. 22, 2017

(54) LOW PAPR WAVEFORM FOR MMW

(71) Applicants: Javad Abdoli, Ottawa (CA); Jianglei Ma, Ottawa (CA); Ming Jia, Ottawa (CA); Wen Tong, Ottawa (CA)

(72) Inventors: Javad Abdoli, Ottawa (CA); Jianglei Ma, Ottawa (CA); Ming Jia, Ottawa (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 14/943,986

(22) Filed: Nov. 17, 2015

(65) Prior Publication Data

US 2016/0353446 A1    Dec. 1, 2016

Related U.S. Application Data

(60) Provisional application No. 62/168,116, filed on May 29, 2015.

(51) Int. Cl.
*H04L 27/26* (2006.01)
*H04L 25/03* (2006.01)
*H04J 13/00* (2011.01)
*H04L 5/00* (2006.01)

(52) U.S. Cl.
CPC ...... *H04L 27/2614* (2013.01); *H04J 13/0007* (2013.01); *H04L 5/0021* (2013.01); *H04L 25/03834* (2013.01); *H04L 27/264* (2013.01); *H04L 27/2634* (2013.01); *H04L 5/0023* (2013.01)

(58) Field of Classification Search
CPC ............... H04L 27/2614; H04L 5/0021; H04L 25/03834; H04L 27/2634; H04L 27/264; H04L 5/0023; H04J 13/0007
See application file for complete search history.

(56) References Cited

U.S. PATENT DOCUMENTS

| | | | |
|---|---|---|---|
| 9,438,457 B2 * | 9/2016 | Ling | H04L 27/2614 |
| 2004/0086054 A1 | 5/2004 | Corral et al. | |
| 2005/0210356 A1 | 9/2005 | Chou et al. | |
| 2009/0268675 A1 * | 10/2009 | Choi | H04L 5/0023 370/329 |
| 2010/0002784 A1 | 1/2010 | Hlinka et al. | |
| 2012/0171972 A1 | 7/2012 | Huang et al. | |
| 2015/0085761 A1 * | 3/2015 | Maltsev | H04B 7/0617 370/329 |
| 2016/0050039 A1 * | 2/2016 | Ma | H04L 5/0016 370/329 |
| 2016/0198474 A1 * | 7/2016 | Raghavan | H04W 72/0466 370/335 |

FOREIGN PATENT DOCUMENTS

| | | |
|---|---|---|
| CN | 1984107 | 6/2007 |
| CN | 101371544 | 2/2009 |

\* cited by examiner

*Primary Examiner* — Duc C Ho (57) ABSTRACT

Methods and systems for signal transmission in millimeter wave (mmW) range. A set of sequences is used to encode a data signal for one layer in a group of layers. Each sequence in the set of sequences has a length equal to the number of resources shared among the group of layers. At least a portion of the sequences have a low density of non-zero values, and the non-zero values are assigned to a subset of the shared resources. Each sequence assigns a non-zero value to at most one resource of the subset of shared resources, and all non-zero values assigned by all sequences have equal power amplitudes.

26 Claims, 9 Drawing Sheets

LOW PAPR WAVEFORM FOR MMW

CROSS-REFERENCE TO RELATED APPLICATIONS

The present disclosure claims priority from U.S. provisional patent application No. 62/168,116, filed May 29, 2015, the entirety of which is hereby incorporated by reference.

FIELD

The present disclosure relates to digital communications, in particular for transmission using millimeter wave (mmW), such as in 5G networks.

BACKGROUND

A typical orthogonal frequency-division multiplexing (OFDM) signal has a relatively large peak-to-average power ratio (PAPR), since it typically consists of a number of independently modulated subcarriers. Since a high PAPR means the signal has a large dynamic range, this tends to increase the complexity of the analog/digital and digital/analog converters (ADC/DAC) required, and also tends to reduce efficiency of the radiofrequency power amplifier (PA). The large PAPR also tends to put a more stringent requirement for linearity on the power amplifier. Further, a higher input back-off factor would be needed to be applied to the signal, due to power amplifier nonlinearity, which may result in significant signal distortion.

In the case of millimeter wave (mmW), the PAPR issue may be even more severe, since the cost of a suitable ADC/DAC and the PA may be even greater. PAPR issues may be of greater concern for uplink transmissions, since the transmitters are user equipment (e.g., typically mobile devices such as cellular telephones) which have more cost, size and power constraints.

A single-carrier frequency-division multiple access (SC-FDMA) approach has been used for uplink transmissions. Although SC-FDMA has lower PAPR than an orthogonal frequency division multiple access (OFDMA) signal, a challenge remains in that SC-FDMA is unable to provide constant PAPR for all modulation levels (e.g., 16-QAM or 64-QAM), since the constellation points do not all have the same power amplitude for higher modulation levels.

SUMMARY

In some examples, the present disclosure describes a method for signal transmission in millimeter wave (mmW) range. The method includes: encoding a data signal, associated with a first layer of a group of layers, using a first set of sequences, to generate a first encoded data signal; each sequence in the first set of sequences having a length equal to the number of resources shared among the group of layers, at least a portion of the sequences of the first set of sequences having a low density of non-zero values, the non-zero values being assigned to a first subset of the shared resources; each sequence assigning a non-zero value to at most one resource of the first subset of shared resources, all non-zero values assigned by all sequences having equal power amplitudes; and transmitting the encoded data signal over the shared resources.

In some examples, the present disclosure describes a system for signal transmission in millimeter wave (mmW) range. The system includes: a processor configured to execute instructions to cause the system to: encode a data signal, associated with a first layer of a group of layers, using a first set of sequences, to generate a first encoded data signal; each sequence in the first set of sequences having a length equal to the number of resources shared among the group of layers, at least a portion of the sequences of the first set of sequences having a low density of non-zero values, the non-zero values being assigned to a first subset of the shared resources; each sequence assigning a non-zero value to at most one resource of the first subset of shared resources, all non-zero values assigned by all sequences having equal power amplitudes; and a transmitter for transmitting the encoded data signal over the shared resources.

In some examples, the present disclosure describes a system for detection of millimeter wave (mmW) signals from a plurality of user equipment (UEs). The system includes: an antenna array comprising a plurality of antenna elements; a processor configured to control operation of the antenna array by: defining the antenna elements into a plurality of antenna element groups, the number of antenna element groups corresponding to the number of UEs; and assigning each respective antenna element group to detect signals from a respective one UE of the plurality of UEs.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In various examples, the present disclosure describes the use of sparse code multiple access (SCMA) combined with pulsed shaped subcarrier based frequency-division multiplexing (FDM) for signal transmission, particularly in the mmW range. Broadly speaking, SCMA is a coding technique that may enable non-orthogonal multiplexing of code layers, resource overloading, sparsity to reduce receiver complexity, multi-dimensional codewords, and spreading over multiple subcarriers.

Figure 7:
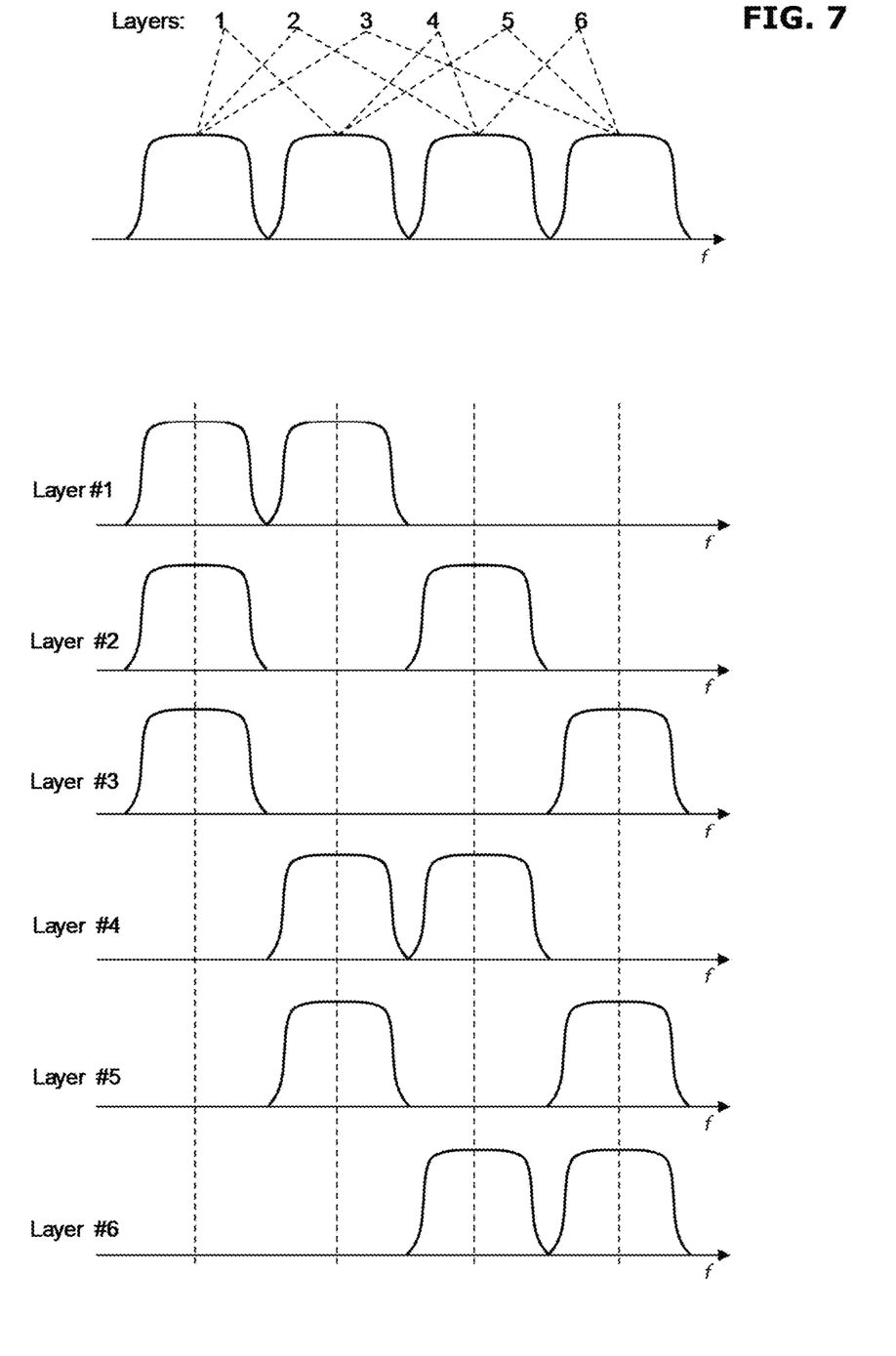
FIG. 7 shows an example of how encoded signals on multiple layers may be multiplexed, in accordance with an example described in the present disclosure.

FIG. 7 shows an example of how a group of layers may be multiplexed over shared resources, in an example implementation of SCMA. In the example shown, there are 6 layers. Each layer may correspond to a different UE, or two or more of the 6 layers may originate from a single UE. Thus, the 6 layers may correspond to 6 UEs or less. In the example shown, the SCMA codeword length is 4, corresponding to 4 subcarriers shown in the frequency domain. As illustrated, SCMA provides sparsity (i.e., a low-density of non-zero values) in at least a portion of the coding sequences, in that each layer is permitted to have non-zero values assigned to only a subset of the shared subcarriers, with each layer having non-zero values for a different subset of the shared subcarriers. The result is that when the layers are superpositioned together (i.e., linearly summed over the subcarriers), in the present example, each non-zero value on a given layer collides with non-zero values on only two other layers on any given subcarrier.

In some examples, the techniques of the present disclosure may help to reduce cyclic processing (CP) overhead, which tends to become more severe for mmW transmissions due to the shorter OFDM symbol duration. In some examples, the present disclosure also provides possibilities to relax time and frequency synchronization requirements, for example by appropriate design of the pulse shape such that it is sufficiently localized in time and frequency.

Figure 1:
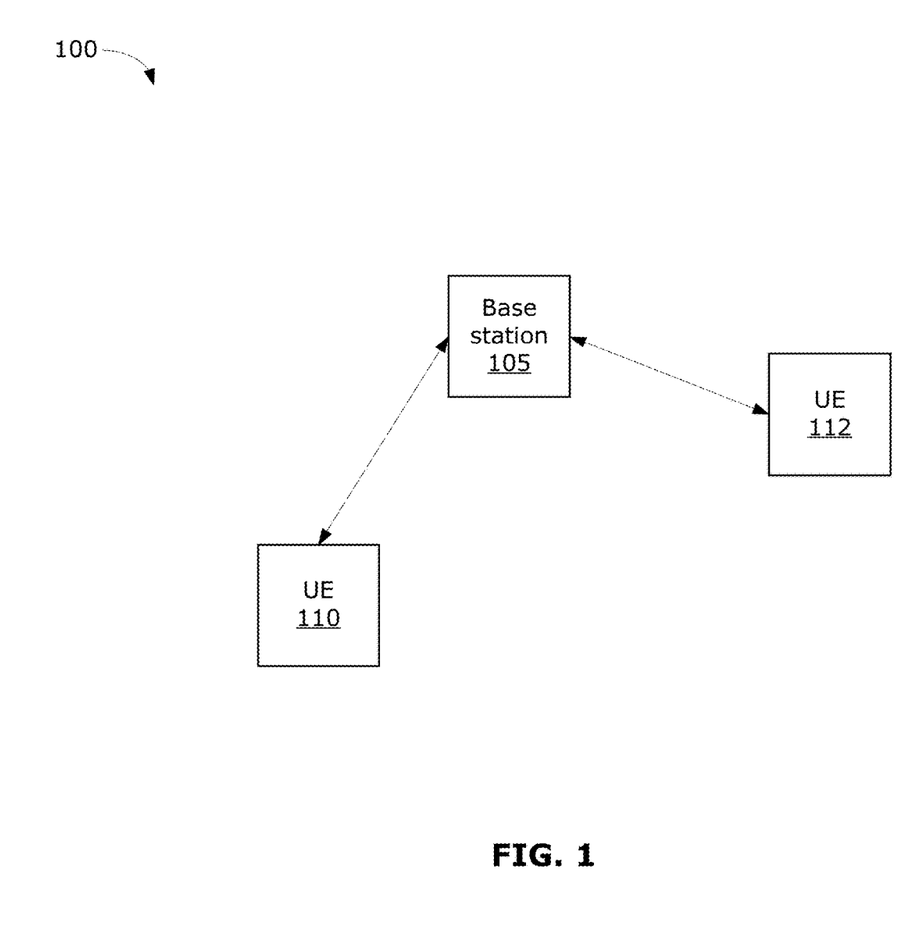
FIG. 1 is a schematic diagram of an example communications system, in accordance with an example described in the present disclosure.

FIG. 1 is a schematic diagram of an example communications system 100, in which examples of the present disclosure may be implemented. The communications system 100 may include a base station 105, which may be an evolved Node B (eNB) in the Long-Term Evolution (LTE) standard. The base station 105 may serve a plurality of UEs 110, 112. The UEs 110, 112 may receive communications from and transmit communications to the base station 105. Communications between the base station 105 and the UEs 110, 112 may take place over the mmW spectrum range.

Although two UEs 110, 112 are shown, it should be understood that the base station 105 may communication with more or less UEs. The base station 105 may also be referred to as an eNode B, controller, base terminal station or access point, for example. The UEs 110, 112 may include any client devices, and may also be referred to as mobile stations, mobile terminals, user devices, client devices or subscriber devices, for example.

Figure 2:
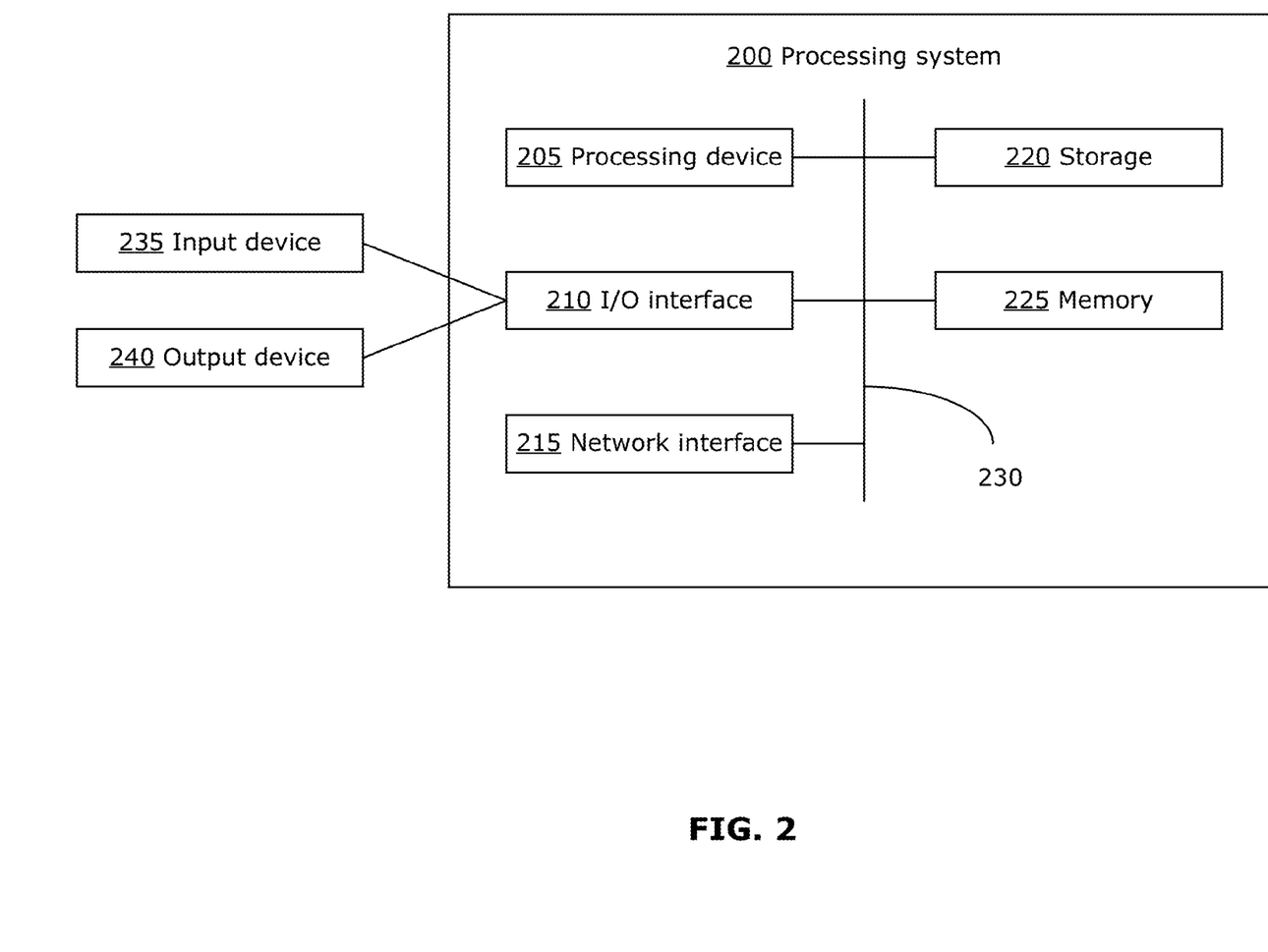
FIG. 2 is a schematic diagram of an example processing system suitable for implementing an example described in the present disclosure.

FIG. 2 is a schematic diagram of an example processing system 200, which may be used to implement the methods and systems disclosed herein, such as the example base station 105 and UEs 110, 112, and the example methods described below. The processing system 200 may be a server or a mobile device, for example, or any suitable processing system. Other processing systems suitable for implementing the present disclosure may be used, which may include components different from those discussed below. Although FIG. 2 shows a single instance of each component, there may be multiple instances of each component in the processing system 200.

The processing system 200 may include one or more processing devices 205, such as a processor, a microprocessor, an application-specific integrated circuit (ASIC), a field-programmable gate array (FPGA), a dedicated logic circuitry, or combinations thereof. The processing system 200 may also include one or more input/output (I/O) interfaces 210, which may enable interfacing with one or more appropriate input devices 235 and/or output devices 240. The processing system 200 may include one or more network interfaces 215 for wired or wireless communication with a network (e.g., an intranet, the Internet, a P2P network, a WAN and/or a LAN). The network interface(s) 215 may include wired links (e.g., Ethernet cable) and/or wireless links (e.g., one or more antennas) for intra-network and/or inter-network communications. The network interface(s) 215 may provide wireless communication via one or more transmitters or transmit antennas and one or more receivers or receive antennas, for example. The processing system 200 may also include one or more storage units 220, which may include a mass storage unit such as a solid state drive, a hard disk drive, a magnetic disk drive and/or an optical disk drive.

The processing system 200 may include one or more memories 225, which may include a volatile or non-volatile memory (e.g., a flash memory, a random access memory (RAM), and/or a read-only memory (ROM)). The non-transitory memory(ies) 225 may store instructions for execution by the processing device(s) 205, such as to carry out the present disclosure. The memory(ies) 225 may include other software instructions, such as for implementing an operating system and other applications/functions. In some examples, one or more data sets and/or module(s) may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 230 providing communication among components of the processing system 200, including the processing device(s) 205, I/O interface(s) 210, network interface(s) 215, storage unit(s) 220 and/or memory(ies) 225. The bus 230 may be any suitable bus architecture including, for example, a memory bus, a peripheral bus or a video bus.

In FIG. 2, the input device(s) 235 (e.g., a keyboard, a mouse, a microphone, a touchscreen, and/or a keypad) and output device(s) 240 (e.g., a display, a speaker and/or a printer) are shown as external to the processing system 200. In other examples, one or more of the input device(s) 235 and/or the output device(s) 240 may be included as a component of the processing system 200.

Figure 3:
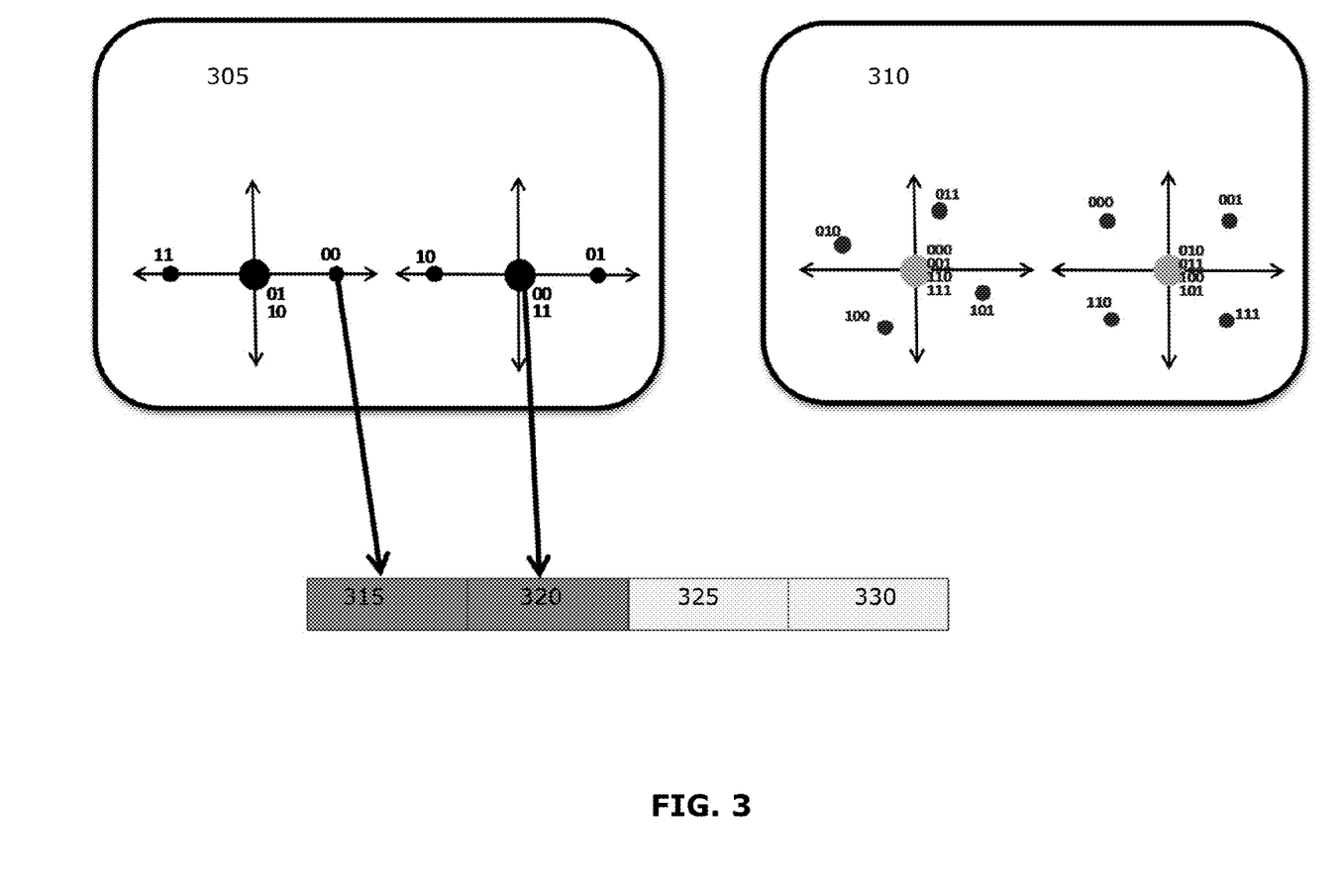
FIG. 3 shows examples of 4-point and 8-point low-PAPR codebooks, in accordance with an example described in the present disclosure.

FIG. 3 show examples of low-PAPR SCMA sequences (e.g., codebooks each containing a respective set of codewords), in accordance with examples of the present disclosure. The examples shown include a 4-point codebook 305 and an 8-point codebook 310. Each codebook 305, 310 may be used by each layer of a group of layers (also referred to as a UE group), after a specific phase rotation, sharing a given set of resources (e.g., subcarriers), using SCMA. For simplicity, the coding for only a single layer (e.g., a single UE) will be described. In this example, in the case where the 4-point codebook 305 is being used, the codeword has four components 315, 320, 325, 330. The components 315, 320, 325, 330 are shown for a layer (e.g., UE-1) in which the first component 315 and the second component 320 are permitted to have non-zero values, while the third component 325 and the fourth component 330 are restricted to zero. Although the first and second components 315, 320 for UE-1 are both permitted to have non-zero values, in the example low-PAPR SCMA codebooks 305, 310, each SCMA codeword has only one active non-zero component, although which of the components 315, 320 has the non-zero value for a given codeword may change.

For example, using the example 4-point codebook 305, the constellation point [0 0] may be mapped to a non-zero value for the first component 315, but a zero value for the second component 320. For another constellation point, such as point [0 1], the point may be mapped to a zero value for the first component 315, but a non-zero value for the second component 320. For the layer shown, the third and fourth codeword components 325, 330 always have zero value.

In various examples, the present disclosure describes codebooks for SCMA, in which at least a portion of the codewords have a low density of non-zero values, such as each SCMA codeword having only one active non-zero component. Further, as illustrated by the example codebooks shown in FIG. 3, all non-zero constellation points have the same power amplitude, for all levels of modulation. Thus, the examples described herein enable low-PAPR transmission.

Although FIG. 3 shows specific examples for 4-point and 8-point codebooks, the principles of these codebooks, as described above, may be implemented in other codebooks, for example 16-point codebooks.

Figure 4:
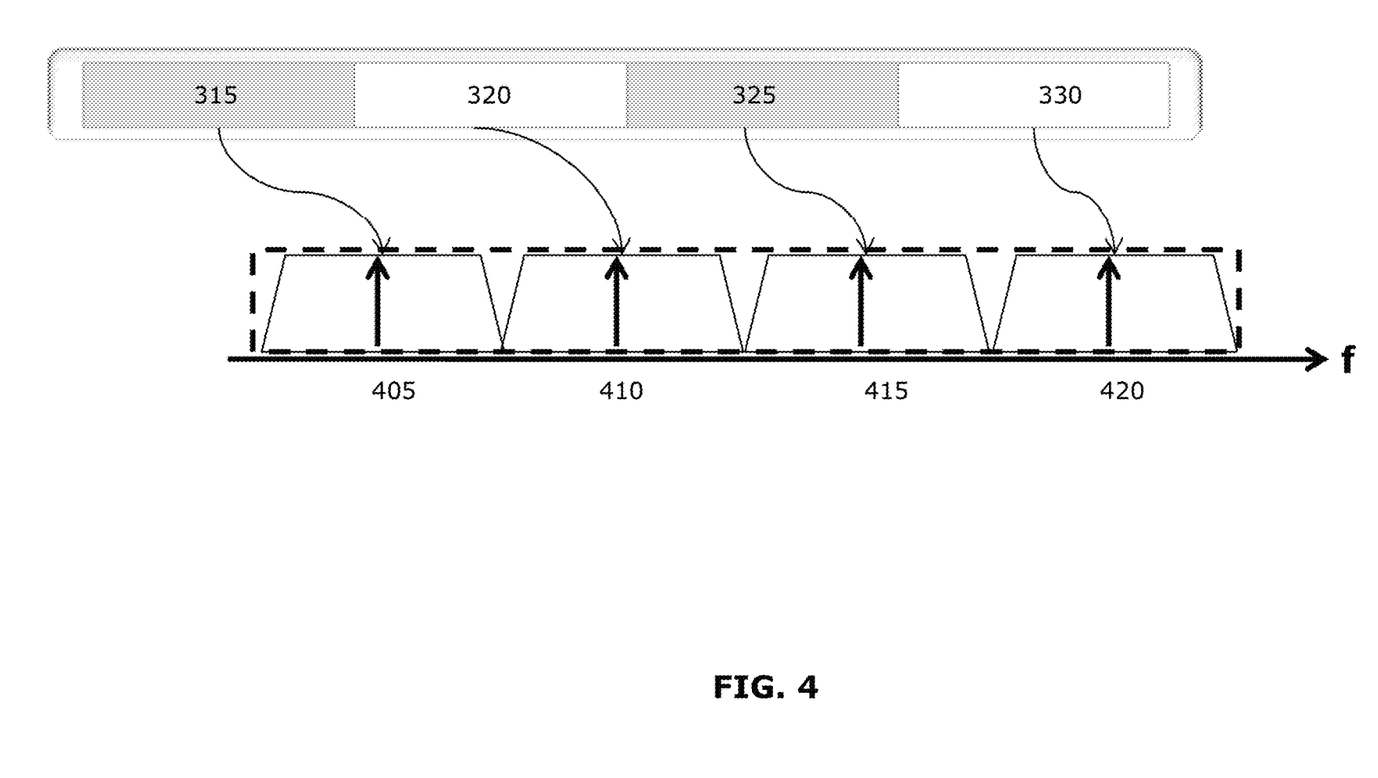
FIG. 4 shows an example of using low-PAPR waveforms for mmW transmission, in which the whole bandwidth is accessed by a single user equipment (UE) group, in accordance with an example described in the present disclosure.

FIG. 4 shows an example implementation of the present disclosure, using low-PAPR waveforms for mmW transmission. In this example, a single group of layers (e.g., a single UE group sharing resources, for example 6 UEs sharing 4 subcarriers) has access to the whole bandwidth. The whole band is partitioned into M sub-bands, where M is the SCMA codeword length (in this example, M=4). Each sub-band is occupied by a subcarrier 405, 410, 415, 420. The M subcarriers 405, 410, 415, 420 are then modulated using a suitable set of low-PAPR SCMA sequences (e.g., a codebook as described with reference to FIG. 3 above). The subcarrier 405, 410, 415, 420 is then pulse-shaped with a suitable pulse shaping filter, for example a root-raised-cosine (RRC) filter.

In FIG. 4, the transmission for a single layer is shown as an example. In this example, the first and third codeword components 315, 325 are permitted to have non-zero values, corresponding to the subcarriers 405, 415. Using an appropriate codebook (e.g., as described above), for each codeword, only one of the first and third components 315, 325 is an active non-zero component during each symbol time; correspondingly, only one of the subcarriers 405, 415 is active during each symbol time for any given codeword.

The pulse shape is shown to be trapezoidal only for the purpose of illustration. A suitable pulse shape for mmW may be used instead. For example, in mmW transmission, a fairly wide pulse shape in the frequency domain (which corresponds to a fairly narrow pulse in the time domain) may be suitable. The pulse shape may be selected such that the pulse for each subcarrier 405, 410, 415, 420 is localized in frequency.

Figure 5:
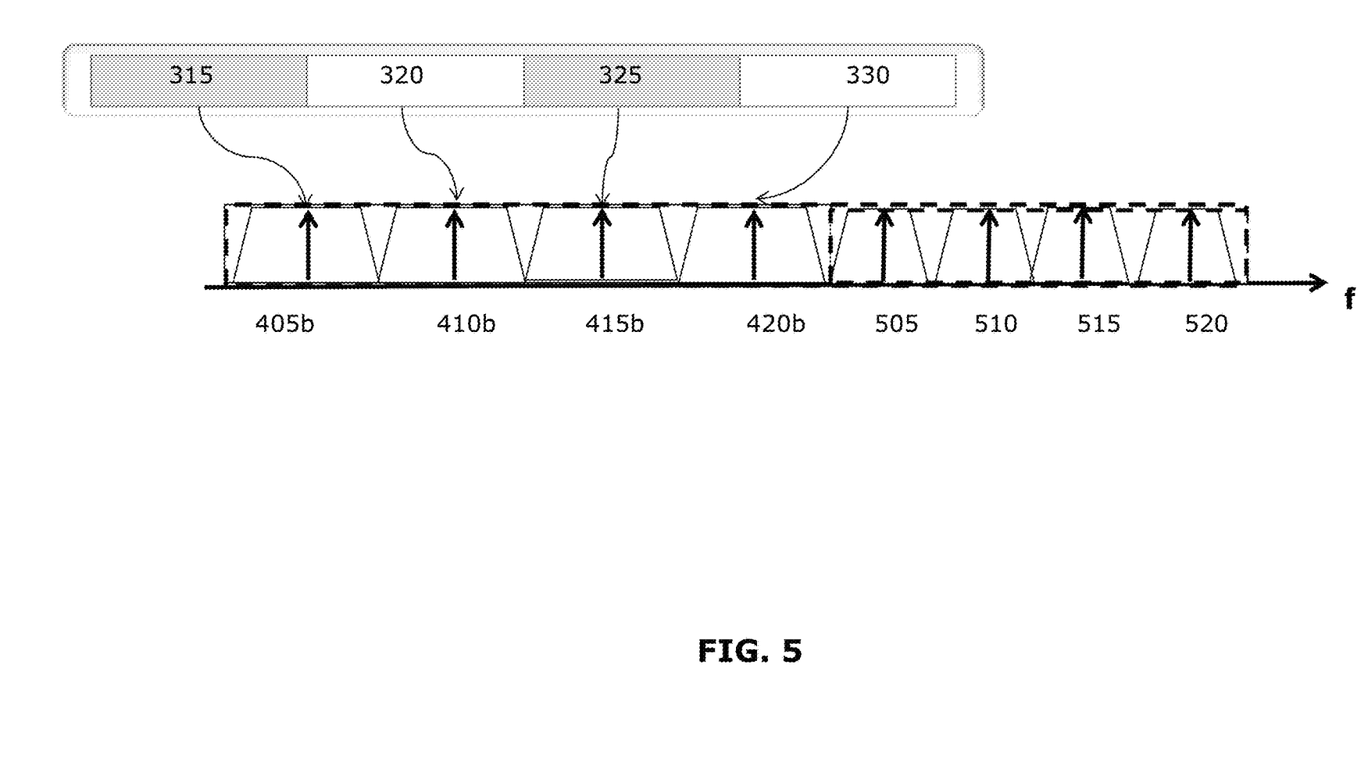
FIG. 5 shows an example of using low-PAPR waveforms for mmW transmission, in which each UE group occupies a portion of the bandwidth, in accordance with an example described in the present disclosure.

In the example of FIG. 5, there are multiple groups of layers (e.g., two UE groups). Each group of layers occupies only a portion of the band. Within the partial band occupied by a single group, the technique may be similar to that described with respect to FIG. 4—however it is the partial band that is partitioned into M sub-bands. In this example, UE group 1 occupies a first set of subcarriers consisting of the subcarriers 405b, 410b, 415b, 420b while UE group 2 occupies a second set of subcarriers consisting of the subcarriers 505, 510, 515, 520. Although referred to as UE groups, a group of layers may also originate from a single UE, for example. Each respective set of subcarriers are then modulated using a suitable set of low-PAPR SCMA sequences (e.g., a codebook as described with reference to FIG. 3 above), then pulse-shaped with a suitable pulse shaping filter.

The portion of the band occupied by a given group may be adjusted (e.g., widened or narrowed) as suitable, for example according to the data rate requirement. This adjusting may be done by the base station dynamically (e.g., depending on dynamic traffic and/or channel conditions, which may be monitored by the base station), semi-statically or the partial bandwidth may be static. It should be noted that as the partial bandwidth is adjusted, the width of the pulse of each subcarrier is also accordingly adjusted, such that there is no significant overlap between subcarriers.

Although UE group 1 and UE group 2 are illustrated as using the same general pulse shape (differing only in pulse width), they may use different pulse shapes. Each UE group may also use different low-PAPR SCMA codebooks, for example. Further, the band may be partitioned into more than two sub-bands, and the sub-bands may be equal or unequal in width.

In some examples, the present disclosure also describes techniques that may be useful for improving time and frequency localization of the pulse.

Figure 6:
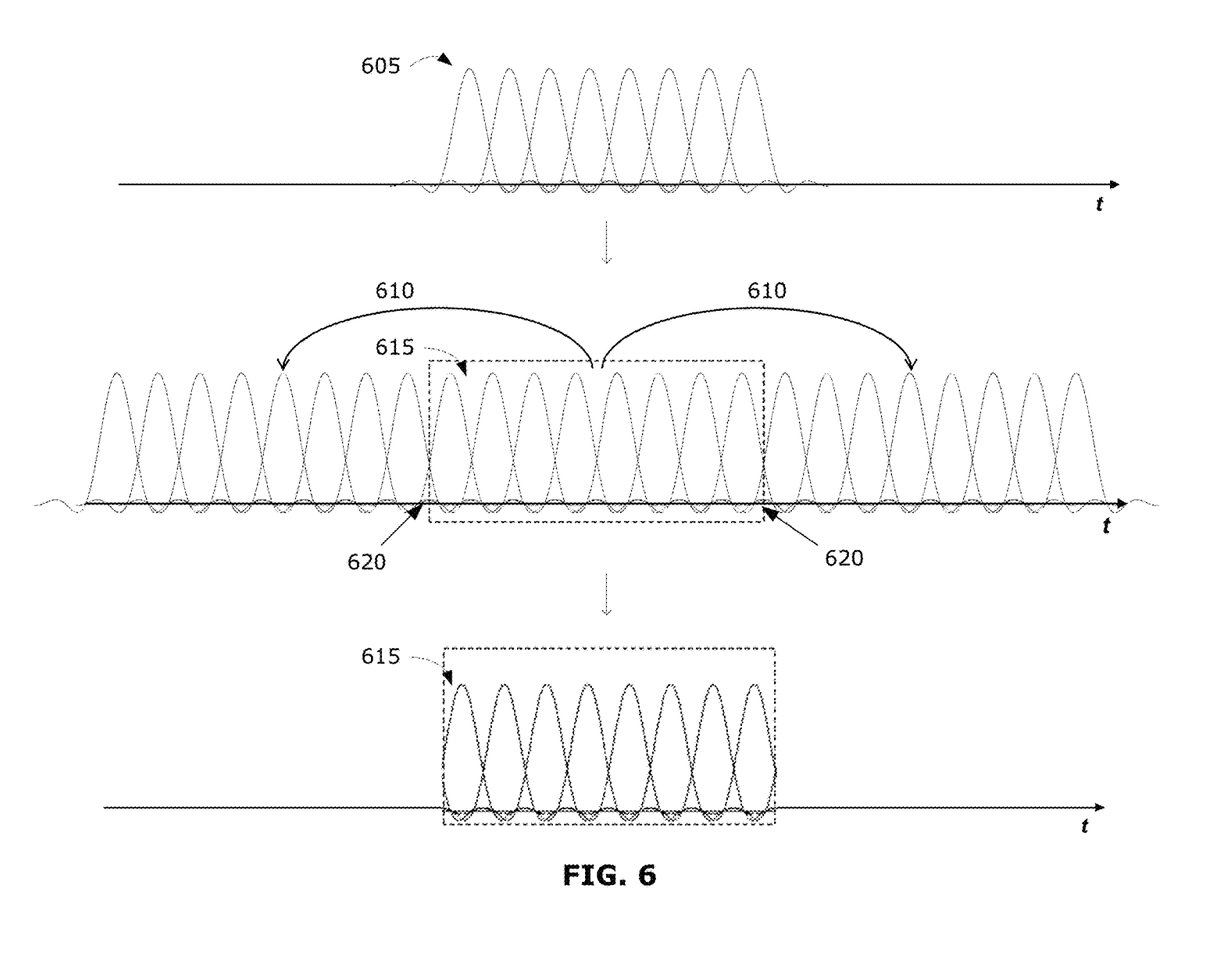
FIG. 6 shows an example of how time domain tails may be removed, in accordance with an example described in the present disclosure.

FIG. 6 shows an example of how time domain tails may be removed, in accordance with an example of the present disclosure. Generally, a pulse that is localized in the frequency domain would be non-localized in the time domain. In practice, there is always truncation of the pulse in time, however this results in some loss of frequency localization. Conventionally, the time length of a transmitted pulse may be significantly longer than the actual symbol time (e.g., about 4 times the actual symbol time) in order to improve the frequency localization, however this adds significant overhead, particularly for mmW transmissions. The example technique illustrated in FIG. 6 may help to improve the frequency localization while limiting the required time length of the pulse. The example technique, which involves the use of circular convolution to remove time domain tails, may be performed per subcarrier. For simplicity, a single subcarrier is illustrated.

As shown in the example of FIG. 6, the original signal 605, comprising 8 pulses, is to be transmitted. In the example technique, copies 610 of the original signal 605 are placed before and after the original signal 605, using circular convolution, thus creating a quasi-periodic signal where the original signal 605 is captured in one period 615 of the quasi-periodic signal. Notably, the front and back tails of the original signal 605 is omitted from the captured period 615, thus improving the time localization of the transmitted signal. The one period 615 is then transmitted. At the receiver, the transmitted period 615 may be used to recreate the signal with suitable time length such that the recreated received signal has the time duration of the original signal 605. It should be noted that, in practice, only appropriate portion(s) of the original signal 605 may be copied and placed before and after the original signal 605.

To further improve the frequency behavior of the signal, time windows may be appended at either ends 620 of the transmitted period 615, to provide a smoother transition. As described herein, a time window may be a short signal section appended to the transmitted period 615 to smoothly transition the end 620 from a non-zero value to a zero value. The time windows may be discarded by the receiver prior to recreating the signal. Although the addition of time windows may add some time overhead, the overhead added (e.g., about ⅛ of the actual symbol time per time window) is expected to be less than the total time overhead using conventional techniques (e.g., which may be about 4 times the actual symbol time).

Another challenge that may be faced in mmW transmission is that typically a very narrow antenna beam is required by the receiver in order to detect a mmW transmission from a given UE, due to the attenuation typical for a mmW transmission. In some examples, a large antenna array, comprising multiple antenna elements, may be used to generate a narrow beam.

Figure 8:
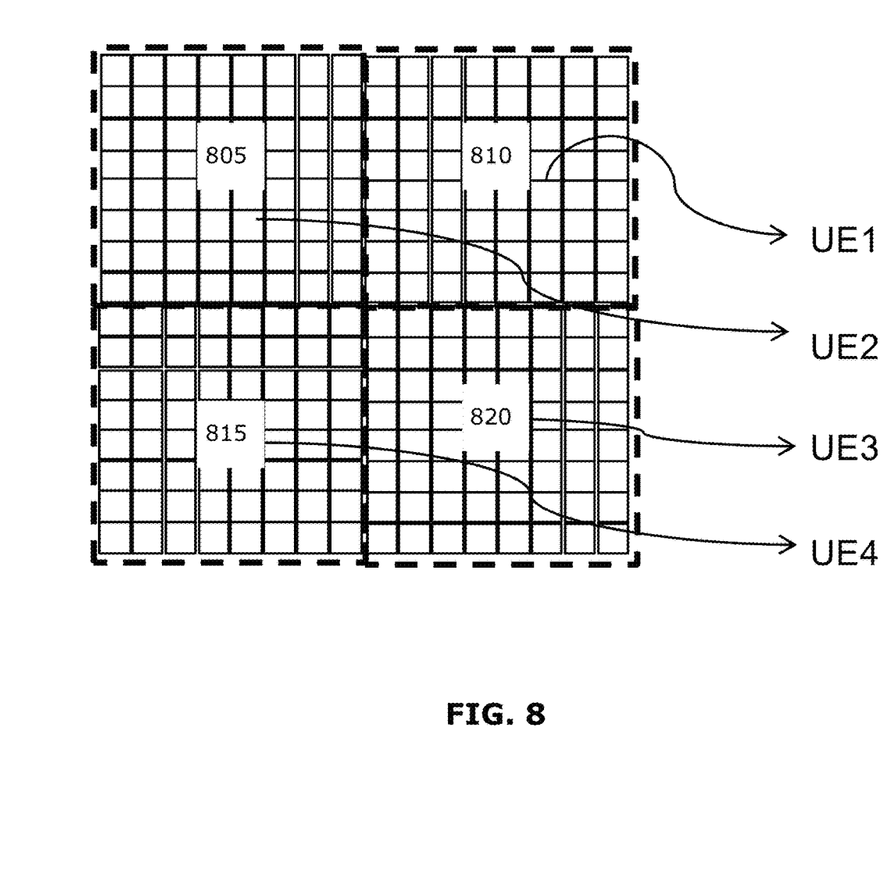
FIG. 8 shows an example of how multiple UEs may be detected using different antenna element groups, in accordance with an example described in the present disclosure.

FIG. 8 shows an example of how signals from multiple UEs may be detected using multiple antenna element groups in an antenna array of antenna elements. In the example shown, there are four antenna element groups 805, 810, 815, 820, with each group being used to detect a different one of four UEs. A message passing algorithm (MPA) receiver, which may be suitable as an SCMA receiver, may be used to manage any inter-user interference—the inter-user interference being any interference signal received by a given antenna element group that is not originating from the UE assigned to that given antenna element group.

Antenna array segmentation may be adjusted by the base station, for example depending on the coverage requirement, the UE conditions (e.g., physical location), signal strength and/or other suitable criteria. The segmentation may be adjusted dynamically, for example. Although FIG. 8 shows the antenna element groups 805, 810, 815, 820 being substantially equal in number of antenna elements and approximately square in shape, the antenna element groups 805, 810, 815, 820 may be adjusted to be different in number of antenna elements and/or shape (e.g., square, rectangular or other appropriate group shape). The detection direction of each antenna element group may also be adjusted dynamically by the base station as the UE moves, for example.

Figure 9:
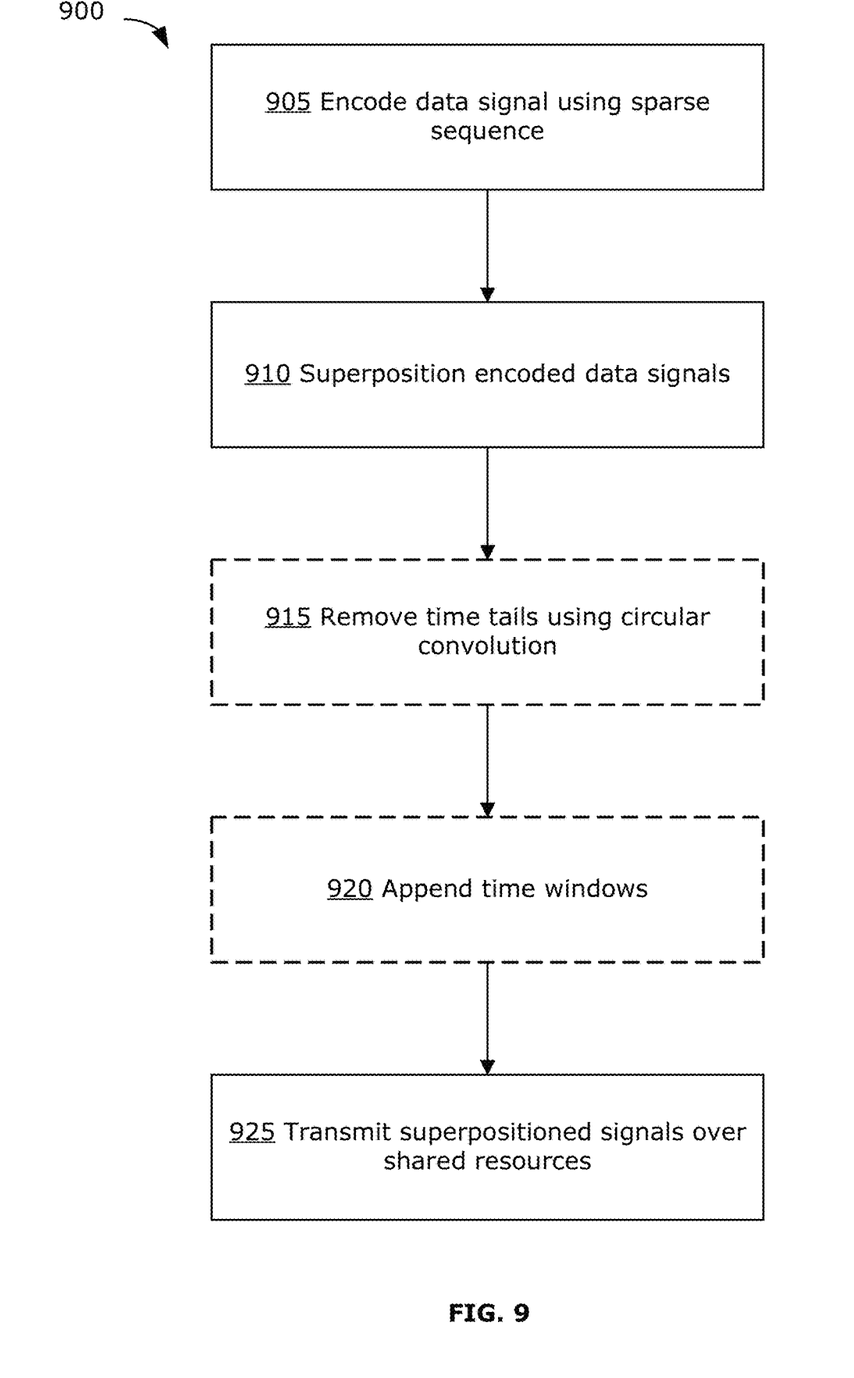
FIG. 9 is a flowchart illustrating an example method for transmitting a signal in mmW, in accordance with an example described in the present disclosure.

FIG. 9 is a flowchart illustrating an example method 900 for transmitting a signal in the mmW range, in accordance with an example of the present disclosure.

At 905, the data signal for each layer in the layer group is encoded using a suitable codebook (e.g., a low-PAPR SCMA codebook as described above).

At 910, the encoded data signals for each layer are superpositioned together, meaning the encoded data signals are linearly summed together over the transmission resources (e.g., subcarriers). It should be noted that superpositioning of the layers in this manner results in multiplexing in the code domain.

At 915, optionally, for each subcarrier, time tails may be removed. This may be performed using the example technique involving circular convolution, as described above.

At 920, optionally, time windows may be appended to the signal to be transmitted.

At 925 the superpositioned (and optionally processed per 915 and/or 920) signals are transmitted over the resources (e.g., subcarriers) shared by the layer group.

The example method 900 illustrates the process that may take place at a base station (e.g., for downlink transmission). A variation of the method 900 may be carried out by the UEs (e.g., for uplink transmission), where different layers may be transmitted by different UEs. For example, a UE may similarly encode a signal to be transmitted using a suitable codebook. If the UE is transmitting signals over multiple layers, this encoding is performed for each layer. The UE may optionally process the encoded signal to remove time tails and/or to append time windows, and then transmit the layer(s) to the base station. The base station may then receive the superposition of all layers from all UEs (after passing through uplink channels).

The present disclosure provides certain example algorithms and calculations for implementing examples of the disclosed methods and systems. However, the present disclosure is not bound by any particular algorithm or calculation.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for signal transmission in millimeter wave (mmW) range, the method comprising:
encoding a data signal, associated with a first layer of a group of layers, using a first set of sequences, to generate a first encoded data signal;
each sequence in the first set of sequences having a length equal to the number of resources shared among the group of layers, at least a portion of the sequences of the first set of sequences having a low density of non-zero values, the non-zero values being assigned to a first subset of the shared resources;
each sequence assigning a non-zero value to at most one resource of the first subset of shared resources, all non-zero values assigned by all sequences having equal power amplitudes; and transmitting the encoded data signal over the shared resources.

2. The method of claim 1, wherein the first set of sequences is a first SCMA codebook and each sequence in the first set of sequences is a codeword in the first SCMA codebook.

3. The method of claim 1, further comprising:
superpositioning the first encoded data signal with at least a second encoded signal associated with a second layer of the group of layers, the second encoded signal being encoded using a second set of sequences;
at least a portion of the sequences of the second set of sequences having a low density of non-zero values, the non-zero values being assigned to a second subset of the shared resources different from the first subset of the shared resources; and
transmitting the superpositioned encoded data signals over the shared resources.

4. The method of claim 3, wherein the second set of sequences is a second SCMA codebook and each sequence in the second set of sequences is a codeword in the second SCMA codebook.

5. The method of claim 1, wherein the shared resources are subcarriers of a given bandwidth in the mmW range.

6. The method of claim 5, wherein the given bandwidth is the entire available band in the mmW range.

7. The method of claim 5, wherein the given bandwidth is a sub-band of the available band in the mmW range.

8. The method of claim 7, wherein the width of the sub-band is dynamically adjustable.

9. The method of claim 1, wherein transmitting the encoded data signal comprises:
applying circular convolution to the encoded data signal to be transmitted over a given resource to generate a quasi-periodic signal, the encoded data signal being captured in a single period of the quasi-periodic signal; and
transmitting the single period of the quasi-periodic signal.

10. The method of claim 9, further comprising:
prior to transmitting the single period, appending time windows on either end of the single period.

11. A system for signal transmission in millimeter wave (mmW) range, the system comprising:
a processor configured to execute instructions to cause the system to:
encode a data signal, associated with a first layer of a group of layers, using a first set of sequences, to generate a first encoded data signal;
each sequence in the first set of sequences having a length equal to the number of resources shared among the group of layers, at least a portion of the sequences of the first set of sequences having a low density of non-zero values, the non-zero values being assigned to a first subset of the shared resources;
each sequence assigning a non-zero value to at most one resource of the first subset of shared resources, all non-zero values assigned by all sequences having equal power amplitudes; and
a transmitter for transmitting the encoded data signal over the shared resources.

12. The system of claim 11, wherein the first set of sequences is a first SCMA codebook, and each sequence in the first set of sequences is a codeword in the first SCMA codebook.

13. The system of claim 11, wherein the processor is further configured to execute instructions to further cause the system to:
superposition the first encoded data signal with at least a second encoded signal associated with a second layer of the group of layers, the second encoded signal being encoded using a second set of sequences;
at least a portion of the sequences of the second set of sequences having a low density of non-zero values, the non-zero values being assigned to a second subset of the shared resources different from the first subset of the shared resources; and
wherein the transmitter is configured for transmitting the superpositioned encoded signals over the shared resources.

14. The system of claim 13, wherein the second set of sequences is a second SCMA codebook, and each sequence in the second set of sequences is a codeword in the second SCMA codebook.

15. The system of claim 13, wherein the system is a base station and the group of layers is associated with one or more user equipments (UEs).

16. The system of claim 11, wherein the system is a user equipment (UE).

17. The system of claim 11, wherein the shared resources are subcarriers of a given bandwidth in the mmW range.

18. The system of claim 11, wherein the given bandwidth is the entire available band in the mmW range.

19. The system of claim 11, wherein the given bandwidth is a sub-band of the available band in the mmW range.

20. The system of claim 19, wherein the processor is further configured to execute instructions to further cause the system to dynamically adjust the width of the sub-band.

21. The system of claim 11, wherein the processor is configured to execute instructions to cause the system to transmit the encoded data signal, the transmitting comprising:
applying circular convolution to the encoded data signal to be transmitted over a given resource to generate a quasi-periodic signal, the encoded data signal being captured in a single period of the quasi-periodic signal; and
transmitting the single period of the quasi-periodic signal over the given resource.

22. The system of claim 21, wherein the processor is configured to execute instructions to further cause the system to:
prior to transmitting the single period, append time windows on either end of the single period.

23. A system for detection of millimeter wave (mmW) signals from a plurality of user equipment (UEs), the system comprising:
an antenna array comprising a plurality of antenna elements;
a processor configured to control operation of the antenna array by:
defining the antenna elements into a plurality of antenna element groups, the number of antenna element groups corresponding to the number of UEs; and
assigning each respective antenna element group to detect signals from a respective one UE of the plurality of UEs.

24. The system of claim 23 further comprising:
a message-passing algorithm (MPA) receiver configured to manage inter-UE interference for each antenna element group.

25. The system of claim 23, wherein the processor is further configured to:
  dynamically adjust which antenna elements are defined into which antenna element group.

26. The system of claim 23, wherein the processor is further configured to:
  dynamically adjust detection direction of each antenna element group, to accommodate mobility of each UE.

* * * * *